(12) United States Patent
Crisan et al.

(10) Patent No.: US 7,720,556 B2
(45) Date of Patent: May 18, 2010

(54) WEB-ENABLED SOLUTIONS FOR MEMORY COMPILATION TO SUPPORT PRE-SALES ESTIMATION OF MEMORY SIZE, PERFORMANCE AND POWER DATA FOR MEMORY COMPONENTS

(75) Inventors: Cristian Teodor Crisan, Gresham, OR (US); Ekambaram Balaji, Portland, OR (US); David W. Vinke, Clackamas, OR (US)

(73) Assignee: LSI Corporation, Milpitas, CA (US)

( * ) Notice: Subject to any disclaimer, the term of this patent is extended or adjusted under 35 U.S.C. 154(b) by 221 days.

(21) Appl. No.: 11/315,959

(22) Filed: Dec. 21, 2005

(65) Prior Publication Data

US 2007/0142930 A1    Jun. 21, 2007

(51) Int. Cl.
*G06F 19/00* (2006.01)
(52) U.S. Cl. .......................................... 700/95; 700/97
(58) Field of Classification Search .................. 700/65, 700/95, 97
See application file for complete search history.

(56) References Cited

U.S. PATENT DOCUMENTS

| | | | | |
|---|---|---|---|---|
| 5,812,416 | A * | 9/1998 | Gupte et al. ................... 716/2 |
| 6,236,989 | B1 | 5/2001 | Mandyam et al. .............. 707/4 |
| 6,249,901 | B1 * | 6/2001 | Yuan et al. ...................... 716/5 |
| 6,484,149 | B1 * | 11/2002 | Jammes et al. .............. 705/726 |
| 6,556,490 | B2 * | 4/2003 | Shubat et al. ................ 365/200 |
| 6,816,817 | B1 * | 11/2004 | Retlich et al. ............... 702/188 |
| 6,832,118 | B1 * | 12/2004 | Heberlein et al. ............. 700/18 |
| 6,889,096 | B2 * | 5/2005 | Spriggs et al. ................ 700/17 |
| 6,907,496 | B2 * | 6/2005 | Langford et al. ............ 711/103 |
| 6,925,543 | B2 * | 8/2005 | Takahashi et al. ........... 711/170 |
| 6,944,665 | B2 | 9/2005 | Brown et al. ................. 709/227 |
| 6,967,882 | B1 * | 11/2005 | Akiyoshi ..................... 365/201 |
| 7,051,318 | B1 * | 5/2006 | Lakshmanan et al. ....... 717/115 |
| 7,092,771 | B2 * | 8/2006 | Retlich et al. ................. 700/72 |
| 7,137,079 | B2 * | 11/2006 | Luo et al. ....................... 716/1 |
| 7,152,194 | B2 * | 12/2006 | Vinke et al. .................. 714/726 |
| 7,181,565 | B2 * | 2/2007 | Surico et al. ................. 711/103 |
| 7,461,371 | B2 * | 12/2008 | Luo et al. .................... 717/167 |
| 2001/0056446 | A1 * | 12/2001 | Ishigami et al. ............. 707/513 |
| 2004/0025001 | A1 * | 2/2004 | Stevens et al. .................. 713/2 |
| 2004/0221197 | A1 * | 11/2004 | Goyal et al. ................... 714/25 |
| 2005/0268185 | A1 * | 12/2005 | Vinke et al. ................. 714/718 |

* cited by examiner

*Primary Examiner*—Ronald D Hartman, Jr.
(74) *Attorney, Agent, or Firm*—Richard H. Krukar; Kermit D. Lopez; Luis M. Ortiz

(57) ABSTRACT

A method, system, and program product includes an interactive network-based site that permits a user to specify, compile, analyze and export memory configuration data associated with at least one memory component manufactured in a manufacturing environment. Such memory configuration data can be specified, compiled analyzed or exported in response to a particular user input through the interactive network-based site.

13 Claims, 18 Drawing Sheets

*160*

162 Memory Selection

164 Memory Data Extraction

166 Memory Analysis

168 Memory Tiling (optional)

169 Memory Archive

171 DieSize Spreadsheet Integration (optional)

WEB-ENABLED SOLUTIONS FOR MEMORY COMPILATION TO SUPPORT PRE-SALES ESTIMATION OF MEMORY SIZE, PERFORMANCE AND POWER DATA FOR MEMORY COMPONENTS

TECHNICAL FIELD

Embodiments generally relate to data-processing methods and systems. Embodiments also relate to data-processing networks. Embodiments also relate to improving manufacturing flow for the manufacturing of memory components in a manufacturing environment.

BACKGROUND

ASIC designs are becoming more memory dependant. It is a common design practice in all market segments to embed as much memory as possible to increase the performance of the design. Even though memory content per design increases between technology nodes, maximum compilable memory macro per instance is decreasing. With these diverging factors, large memory instances are implemented through numerous smaller instances. This implementation method can create a number of issues during front-end and back-end design phases. During the front-end design phase, for example resources are required to select the correct smaller configuration to assemble the original large memory configuration. Such a phase can result in an iterative process because this technique does not take into account design priorities such as performance, density, and power considerations. Multiple implementations must be considered before selecting an approach based on the priorities of a particular design. At the back-end, using numerous small instances to form a large instance can require that designers create muxing circuitry to tie-up such instances. In addition, the higher the number of small instances utilized, the higher the routing complexity, and routing overhead that result.

To improve the turn-around-time (TAT) both at the front-end and back-end design phases, a tool that automatically selects the proper implementation of a large memory instance based on design priorities is necessary for improving design efficiency and maximizing the use of limited resources, particularly form a customer perspective A number of problems are associated with existing approaches. For example, the lack of a user friendly automation process for assisting a designer in selecting memory instance implementation for a design based on functional memory requirements is one problem. For a given memory instance, for example, RFQs typically specify the type of memory (single, dual, two port, etc.), configuration (words× bits), and operating frequency. In a manufacturing environment, for example, is typically the responsibility of the ASIC engineer or FAE (Field Application Engineer) to determine the best implementation to meet the performance requirements while minimizing the die area. The response to the RFQ will require die area, performance, and power estimations. Note that as utilized herein the acronym "RFQ" refers generally to a "Request for Quotation" and is typically implemented as a solicitation document used in purchasing. A RFQ is requested for information. Quotes submitted in response to it are not offers that the buyer will normally accept without some confirmation or discussion with offerors.

Existing tools must be manually iterated by using different options to understand the best implementation based on the design goals. For large memory macros, for example this task becomes even more challenging, as FAEs must now determine the partition method for combining multiple instances to meet the original configuration and performance requirements. The process is tedious, time consuming, and not the efficient way to utilize FAE resources.

Although a recommended implementation method is given to the customer by the work FAEs has done, many customers are required to utilize the same process if their memory requirements change. In this case, the process is even more problematic because the customers do not have the familiarity with LSI memory compilers and tools that our FAEs do.

Other problems associated with existing solutions is the lack of a capability to input, generate, store and manage a large number of memory configurations/instances in a database and reduce TAT by automating and improving process of memory selection. Additionally, latch-based memory (LBRAM) flow for generating size, timing and power information uses a number of $3^{rd}$ party tools. There is no tool to assist the designer in deciding whether particular memory configurations should be generated using SRAM or LBRAM. In addition to such problems, the overall memory selection decisions at the pre-sales stage based on design priorities: density, performance, power cannot be easily made due to the many memory compiler options. Additionally, present solutions do not provide a robust capability for "what if" and tradeoff analysis, suggestion of memory tiles for large Megabit memories. No mechanism for store memory instances in a reusable manner is presently available in the context of such existing solutions.

Current solutions are limited in scope and applicability. For example, the only current available option involves manually running a number of tools in order to generate G12/Gflx SRAM, LBRAM and G90 SRAM memory configuration data, such as, for example, Isimemory Gflx/G12 SRAM's, and Virage tools for G90 SRAM's. In such scenarios, FAE's must manually run a compiler application to generate LBRAM's, then use a complex characterization flow to generate timing and power information for the LBRAM's. Data must be manually inserted into the DieSize spreadsheet. Such a process is highly inefficient and takes a great deal of time (e.g., days), thus impacting the turn around time to get a quote back to the customer.

Determining valid compiler options to be specified to Isimemory is time consuming. Generating datasheets through current applications takes 10 times longer than through the use of extraction engines. In general, FAE's are forced to pull together information from many sources and manually enter the data into a "die size" spreadsheet.

Generating LBRAM timing data also requires $3^{rd}$ party software. The flow for generating power parameters is very complex and time consuming for FAE's to run on a daily basis. Additionally, Virage tools are not available at every design center site. Because Virage tools are not yet available for general release, there also exists very little in the way of training and documentations for FAE's other than what is provided by the software supplier. Extracting data from such output files requires that certain pieces of data are estimated, rather than generated by running tools resulting in grossly inaccurate data or overestimated values. For example, SRAM power numbers are also utilized for LBRAM's. In effect, such existing solutions result in an inefficient use of the FAE, the design center and customer resources during the manufacturing process.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide improved data-processing methods and systems.

It is another aspect of the present invention to provide for a user interactive tool implemented in the context of a network-based site.

It is a further aspect of the present invention to provide an improved manufacturing flow for the manufacturing of memory components in a manufacturing environment.

It is a further aspect of the present invention to provide for a single web-based tool for specifying, generating, analyzing and exporting memory configuration data.

The aforementioned aspects of the invention and other objectives and advantages can now be achieved as described herein. A method, system, and program product are disclosed comprising an interactive network-based site that permits a user to specify, compile, analyze and export memory configuration data associated with at least one memory component manufactured in a manufacturing environment. Such memory configuration data can be specified, compiled analyzed or exported in response to a particular user input through the interactive network-based site.

BRIEF DESCRIPTION OF THE DRAWINGS

The accompanying figures, in which like reference numerals refer to identical or functionally-similar elements throughout the separate views and which are incorporated in and form part of the specification, further illustrate embodiments of the present invention.

FIG. 6 illustrates a high-level flow chart of operations illustrating logical operational steps that can be implemented in accordance with a preferred embodiment;

Figure 10:
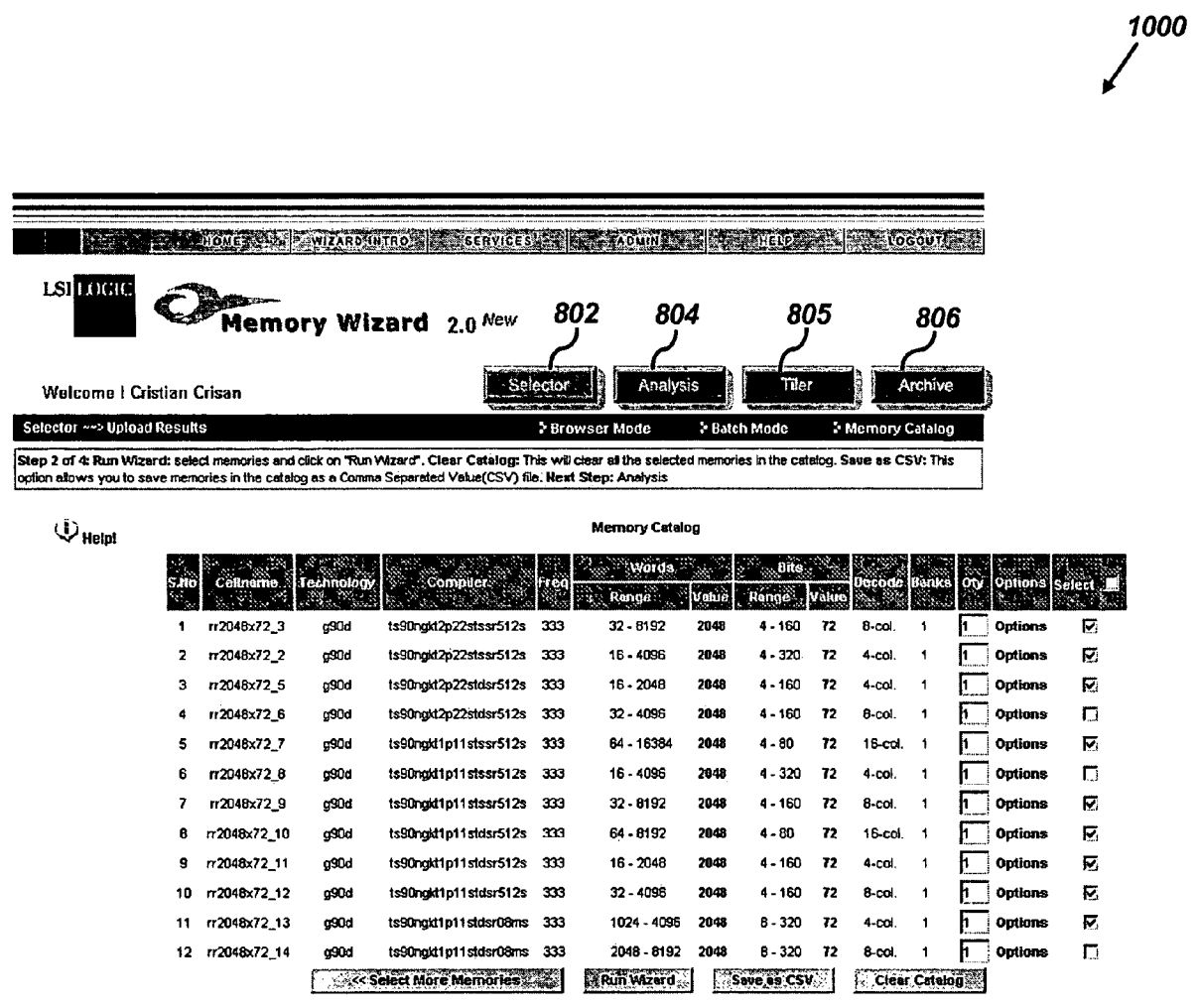

FIG. 10 illustrates a further example of a graphical user interface environment that can be implemented in accordance with a preferred embodiment;

FIG. 18 illustrates a further example of a graphical user interface environment that can be implemented in accordance with a preferred embodiment.

DETAILED DESCRIPTION OF THE INVENTION

The particular values and configurations discussed in these non-limiting examples can be varied and are cited merely to illustrate an embodiment of the present invention and are not intended to limit the scope of the invention.

The following terminology is utilized at various locations within the disclosure provided herein:

Wizard: Web-based estimation tool capable of managing large number of memory instances for pre-sales memory selection. It supports all memory sizing (LBRAM, SRAM) and provides automation for memory generation, review and selection.

LBRAM: Latch-based memory

ASIC: Application Specific Integrated Circuit

Tiler: One of the tools inside Wizard that generates large megabit memory blocks by tiling smaller memory instances XML: Extensible Markup Language ISH: Executable logic utilized to generate G90 EDA views, including ASCII and XML datasheets.

ColdFusion: Macromedia's web scripting language supporting dynamic web page creation and database access in a web server environment.

CFM/CFML: ColdFusion Markup Language

RFQ: Request For Quote. This document contains design information, including functional memory requirements.

CGI: Common Gateway Interface

TAT: Turn Around Time

FAE: Field Application Engineer

BIST: Built In Self Test

BISR: Built In Self Repair

Figure 1:
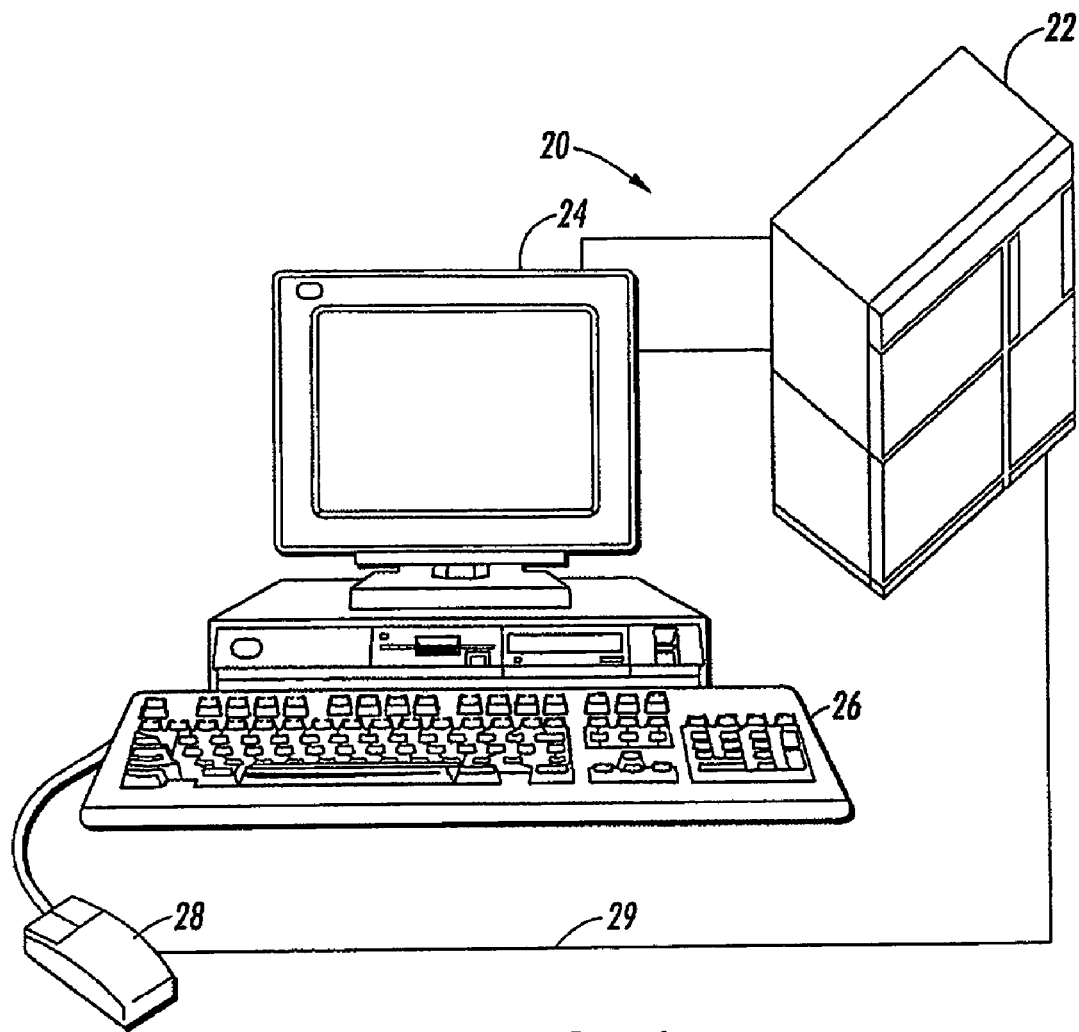
FIG. 1 illustrates a pictorial representation of a data-processing apparatus, which may be utilized to implement one embodiment.
Figure 2:
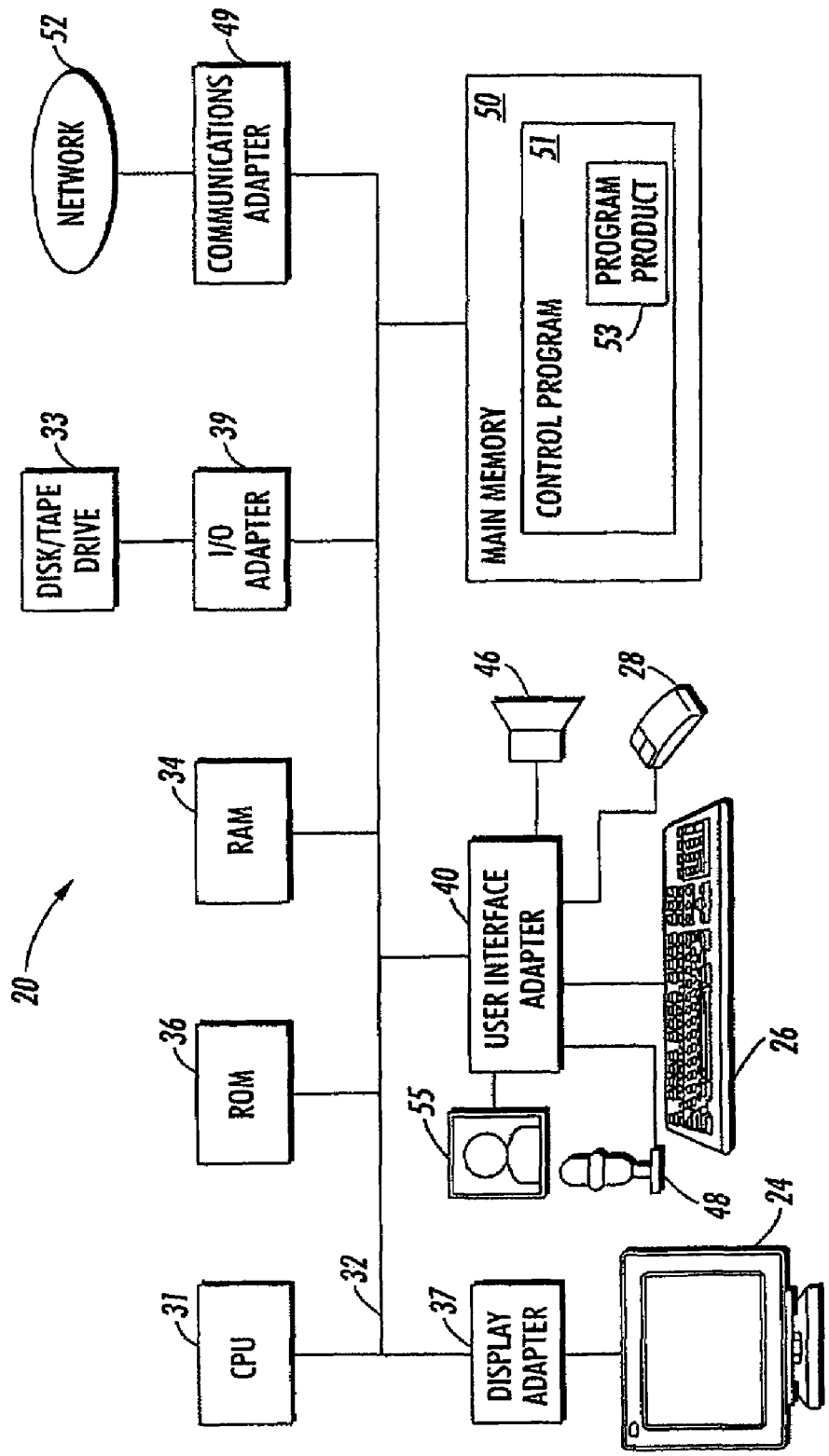
FIG. 2 depicts a representative hardware environment, which may be utilized to implement the data-processing apparatus depicted in FIG. 1.

FIG. 1 illustrates a pictorial representation of a data-processing apparatus 20, which may be utilized to implement one embodiment. Data processing apparatus 20 generally includes a system unit 22, a video display terminal 24, a keyboard 26, and a mouse 28. Those skilled in the art can appreciate that the method and system of the present invention apply equally to any computer system, regardless of whether the computer system is generally implemented as a complicated multi-user computing apparatus or a single-user workstation. In FIG. 1 and FIG. 2, like parts are identified by like numbers.

FIG. 2 depicts a representative hardware environment of data-processing apparatus 20 depicted in FIG. 1. In general, data-processing apparatus 20 can include a Central Processing Unit ("CPU") 31, such as a conventional microprocessor, and a number of other units interconnected via system bus 32. Such components and units of data-processing apparatus 20 can be implemented in a system unit such as system unit 22 of FIG. 1. Data-processing apparatus 20 further includes random-access memory ("RAM") 34, read-only memory ("ROM") 36, display adapter 37 for connecting system bus 32 to video display terminal 24, and I/O adapter 39 for connecting peripheral devices (e.g., disk and tape drives 33) to system bus 32.

Video display terminal 24 generally provides the visual output of data-processing apparatus 20. Video display terminal 24 can be implemental as a CRT-based video display, well known in the art of computer hardware. In the context of a portable or notebook-based computer, however, video display terminal 24 can be replaced with a gas plasma-based or LCD-based flat-panel display. Data-processing apparatus 20 further includes user interface adapter 40 for connecting keyboard 26, mouse 28, speaker 46, microphone 48, and/or other user interface devices, such as a touch-screen device (not shown) or a track-ball device 55 to system bus 32.

Communications adapter 49 connects data-processing apparatus 20 to a network 52, such as a computer network. Such a computer network may be implemented as, for example, the computer network configuration described herein with reference to FIGS. 3 to 5. Although data-processing apparatus 20 may be shown to contain only a single CPU and a single system bus, it should be understood that the embodiments described herein can apply equally to computers or computer systems possessing multiple CPUs and to computer systems that have multiple buses that each perform different functions in different manners.

Data-processing apparatus 20 also includes an interface that resides within a machine-readable media to direct the operation of data-processing apparatus 20. Any suitable machine-readable media may retain the interface, such as RAM 34, ROM 36, a magnetic diskette, magnetic tape, or optical disk (the last three being located in disk and tape drives 33). Any suitable operating system and associated interface (e.g., Microsoft Windows) may direct CPU 31. Other technologies also can be utilized in conjunction with CPU 31, such as touch-screen technology or human voice control.

It can be appreciated that the hardware depicted in FIG. 2 may vary for specific applications. For example, other peripheral devices such as optical disk media, audio adapters, or chip programming devices, such as PAL or EPROM programming devices well-known in the art of computer hardware and the like, may be utilized in addition to or in place of the hardware already depicted. Additionally, it can be appreciated that data-processing apparatus 20 can be implemented in the context of other data-processing devices, such as laptop computers, personal digital assistants (PDAs), cellular telephones, and so forth. Data processing apparatus 20 is therefore described herein with respect to one particular embodiment for illustrative and edification purposes only.

Main memory 50 may be connected to system bus 32, and includes a control program 51. Control program 51 resides within main memory 50, and contains instructions that, when executed on CPU 31, carries out the operations depicted in the logic flow diagrams described herein. Control program 51 may be implemented as a program product 53, or may include software modules or functions based on program product 53. Such a program product may be implemented as, or may include, signal-bearing media such as recordable media and/or transmission media. Control program 51 can contain constructions that when executed on CPU 31 carry out logical operations as described in greater detail herein such as, for example, the logical operational steps and operations depicted herein with respect to FIGS. 6-7. Such a computer program product also can be referred to as a program product. Control program 51 can support a number of Internet-access tools including, for example, an HTTP-compliant Web "browser." Known browser software applications include: Netscape Navigator® ("Netscape"), Mozilla Firefox, and the like. The embodiments described herein can be designed to operate with any of these known or developing Web browsers.

It is important to note that, while the embodiments are generally described in the context of a fully functional computer system, it can be appreciated that the embodiments discussed herein are capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links.

The program product itself may be compiled and processed as a module. In programming, a module may be typically organized as a collection of routines and data structures that perform a particular task or implements a particular abstract data type. Modules are typically composed of two portions, an interface and an implementation. The interface lists the constants, data types, variables, and routines that can be accessed by other routines or modules. The implementation may be private in that it is only accessible by the module. The implementation also contains source code that actually implements the routines in the module. Thus, a program product can be formed from a series of interconnected modules or instruction modules dedicated to working together to accomplish a particular task.

Figure 3:
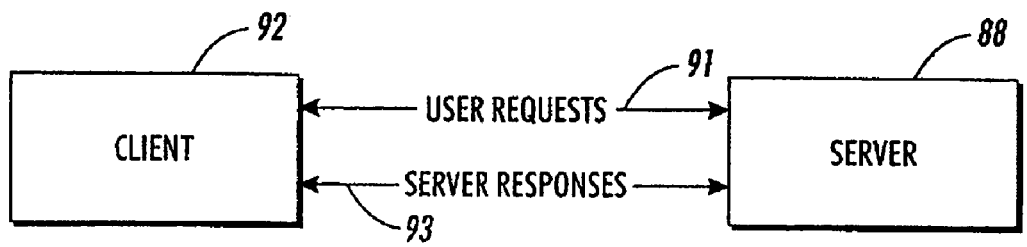
FIG. 3 illustrates a block diagram illustrative of a client/server architecture in accordance with one embodiment.
Figure 4:
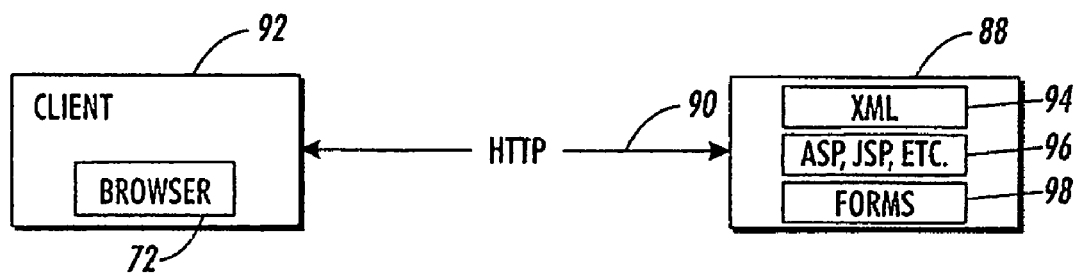
FIG. 4 illustrates a detailed block diagram of a client/server architecture that may be adapted for use in accordance with one possible embodiment.
Figure 5:
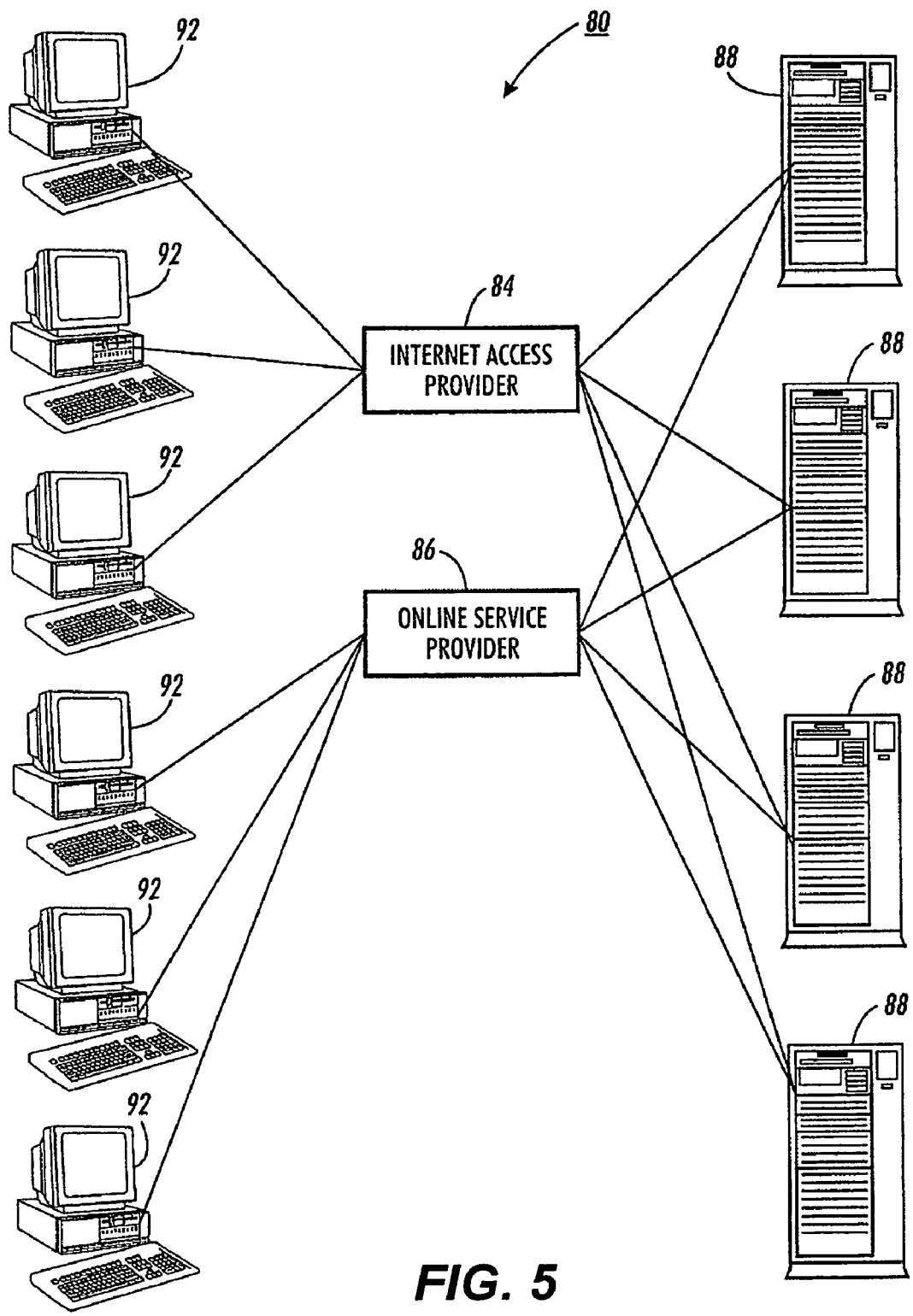
FIG. 5 is a diagram illustrative of a computer network, which can be implemented in accordance with an embodiment.

In FIG. 3, FIG. 4, and FIG. 5, like parts are indicated by like numbers. FIG. 3 illustrates a block diagram illustrative of a client/server architecture in accordance with one embodiment. In FIG. 3, a client application program 92 sends user requests 91 to a server 88. Server 88 can be a remote computer system accessible over the Internet or other communication networks. Client application program 92 may be utilized in association with computer 10 of FIG. 2 and the implementation of computer 10, as illustrated in FIG. 3.

Server 88 can perform, for example, scanning and searching information sources and, based upon these user requests, presents the filtered electronic information as server responses 93 to the client process. The client process may be active in a first computer system, and the server process may be active in a second computer system, communicating with one another over a communications medium, thus providing distributed functionality and allowing multiple clients to take advantage of the data-processing and/or data-gathering capabilities of the server.

FIG. 4 illustrates a detailed block diagram of a client/server architecture that can be adapted for use in accordance with one possible embodiment. Although the client and server are processes that are operative within two computer systems, these processes being generated from a high-level programming language (e.g., PERL), which may be interpreted and executed in a computer system at runtime (e.g., a workstation), it can be appreciated by one skilled in the art that they may be implemented in a variety of hardware devices, either programmed or dedicated.

Client 92 and server 88 can communicate, for example, utilizing the functionality provided by HTTP. Active within client 92 is a first process, browser 72, which establishes connections with server 88, and presents information to the user. Any number of commercially or publicly available browsers can be utilized in various implementations in accordance with an embodiment.

Server 88 can execute the corresponding server software, which presents information to the client in the form of, for example, HTTP responses 90. The HTTP responses 90 correspond with the Web pages represented using HTML, XML, or other data generated by server 88. Server 88 can provide, for example, XML 94. With certain browsers, a web server 96 can be provided, which allows the client program to direct server 88 to commence execution of a specified program contained within server 88. This may include, for example, a search engine that scans received information in the server for presentation to the user controlling the client, depending upon design considerations.

Examples of web server 96 include web servers such as ASP, JSP, and so forth. ASP, for example, is an acronym for "Active Server Pages," which is a technology that enables users to configure dynamic and interactive web pages. ASP utilizes server-side scripting to dynamically produce web pages that are not affected by the type of browser the web site visitor is using. JSP, on the other hand, is acronym for Short for Java Server Page, which is a server-side technology. Thus, a wide variety of web servers can be implemented in accordance with varying embodiments. ASP and JSP are referenced here for general illustrative and edification purposes only and are not considered limiting features of the embodiments.

By utilizing this interface, and HTTP responses 90, server 88 may notify the client of the results of that execution upon completion. Common Gateway Interface (CGI) 96 may be one form of a gateway, a device utilized to connect dissimilar networks (i.e., networks utilizing different communications protocols) so that electronic information can be passed from one network to the other. Gateways transfer electronic information, converting such information to a form compatible with the protocols used by the second network for transport and delivery.

In order to control the parameters of the execution of this server-resident process, the client may direct the filling out of certain "forms" from the browser. This may be provided by the "fill-in-forms" functionality (i.e., forms 98) that may be provided by some browsers. This functionality allows the user via a client application program to specify terms in which the server causes an application program to function (e.g., terms or keywords contained in the types of stories/articles, which are of interest to the user). This functionality is an integral part of the search engine. It can be appreciated that the architecture illustrated in FIG. 4 is not a limiting feature of the embodiments, but is described for generally edification and illustrative purposes only. It can be appreciated that the embodiments disclosed herein can be practiced in the context of a wide variety of network architectures, not merely the architecture depicted in FIG. 4.

FIG. 5 is a diagram illustrative of a computer network 80, which can be implemented in accordance with an embodiment. Computer network 80 is representative of the Internet, which can be described as a known computer network based on the client-server model discussed herein. Conceptually, the Internet includes a large network of servers 88 that are accessible by clients 92, typically users of personal computers, through some private Internet access provider 84 or an on-line service provider 86 (e.g., America Online, CompuServe, etc). Note that computer network 80 of FIG. 5 may be analogous to computer network 52 illustrated in FIG. 2 herein.

Each of the clients 92 may run a browser to access servers 88 via the access providers. Each server 88 operates a so-called "Web site" that supports files in the form of documents and web pages. A Universal Resource Locator (URL) having a known syntax for defining a network collection may identify a network path to servers 88. Computer network 80 can thus be considered a Web-based computer network.

Based on the foregoing, it can be appreciated that computer network 80 can be implemented in the context of computerized information resources, such as the "Internet" that is accessible utilizing so-called "Web" browsers that permit users of data-processing systems and devices (e.g., data-processing system 20 described earlier) to link to other servers and networks, and thus retrieve vast amounts of electronic information heretofore unavailable in an electronic medium.

Note that the term "Internet" is an abbreviation of "Internetwork," and refers to the collection of networks and gateways that utilize the TCP/IP suite of protocols, which are well known in the art of computer networking. TCP/IP is an acronym for "Transmission Control Protocol/Internet Protocol," a software protocol originally developed by the Department of Defense for communication between computers, but now primarily utilized as one of a number of standardized Internet communications protocols. The so-called World Wide Web or simply the "Web" facilitates the globally linked network or system of computers known as the "Internet".

FIG. 6 illustrates a high-level flow chart 160 of operations illustrating logical operational steps that can be implemented in accordance with a preferred embodiment. The methodology depicted in flow chart 160 of FIG. 6 generally relates to the implementation of a "Memory Wizard," which is described in greater detail herein. Such a Memory Wizard can provide an automated solution where FAEs, customers, and design centers are presented with multiple implementation options for a given memory instance. The implementation options detail trade-offs between performance, density, power, instance aspect ratio, and column decoding options. The Memory Wizard described herein with respect to particular embodiments utilizes a waterfall data model, where output from one step is used as an input for the next step. The Memory Wizard flow can be broken down into the steps illustrated at blocks 162 to 172 in FIG. 6.

Thus, as indicated at block 162, memory selection occurs and thereafter as depicted at block 164, an operation involving memory data extraction can be processed. Next, as illustrated at block 166, a memory analysis operation is processed followed by processing of an optional memory tiling operation as depicted at block 168. Thereafter, as described at block 169, an operation can be processed in which data is archived to memory, following by an step in which a "DieSize" spreadsheet integration operation is processed (optionally), as indicated at block 171.

Figure 7:
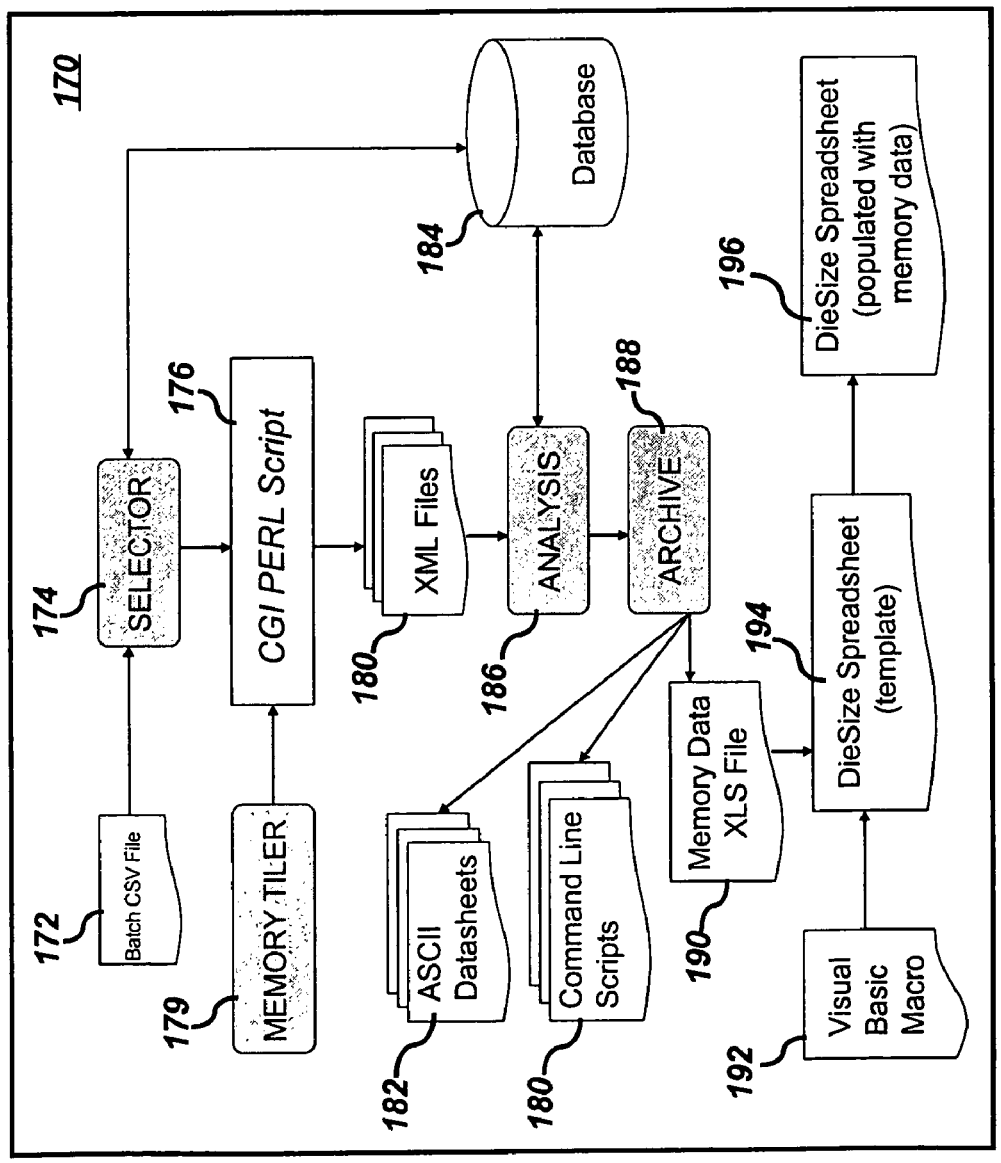
FIG. 7 illustrates a high-level flow chart of operations depicting system level operations in accordance with a preferred embodiment.

FIG. 7 illustrates a high-level flow chart 170 of operations depicting system level operations in accordance with a preferred embodiment. In general, a batch file as indicated at block 172 can be provided to a selector application as depicted at block 174, which receives data from a database 184. Data output from the selector application as depicted at block 174 can then be transferred an application as indicated at block 176 for processing, for example, CGI PERL script or another appropriate script language. An application that functions a memory tiler as indicated at block 179 can also provide data to the application for processing CGI PERL script. Following processing of the operation depicted at block 176, data can be transferred to XML files as depicted at block 189. Note that in FIG. 7, blocks 174, 179, 186, and 188, which are shaded, indicate the available of GUI tools at, for example, http://wizard. The aforementioned script language can invoke native and/or 3$^{rd}$ party tools to generate memory size, power, timing and test overheads, such as, for example, BIST, BISR gate counts and fuse size.

The methodology depicted in FIGS. 6-7 can be implemented in the context of modules. In the computer programming arts, a module can be implemented as a collection of routines and data structures that performs particular tasks or implements a particular abstract data type. Modules generally are composed of two parts. First, a software module may list the constants, data types, variable, routines and the like that that can be accessed by other modules or routines. Second, a software module can be configured as an implementation, which can be private (i.e., accessible perhaps only to the module), and that contains the source code that actually implements the routines or subroutines upon which the module is based.

Thus, for example, the term module, as utilized herein generally refers to software modules or implementations thereof. Such modules can be utilized separately or together to form a program product 53 (i.e., see program product 53 in FIG. 2) that can be implemented through signal-bearing media, including transmission media and recordable media. The methodology disclosed in FIGS. 6-7 can also be implemented in the context of a system composed of one or more such modules.

Figure 8:
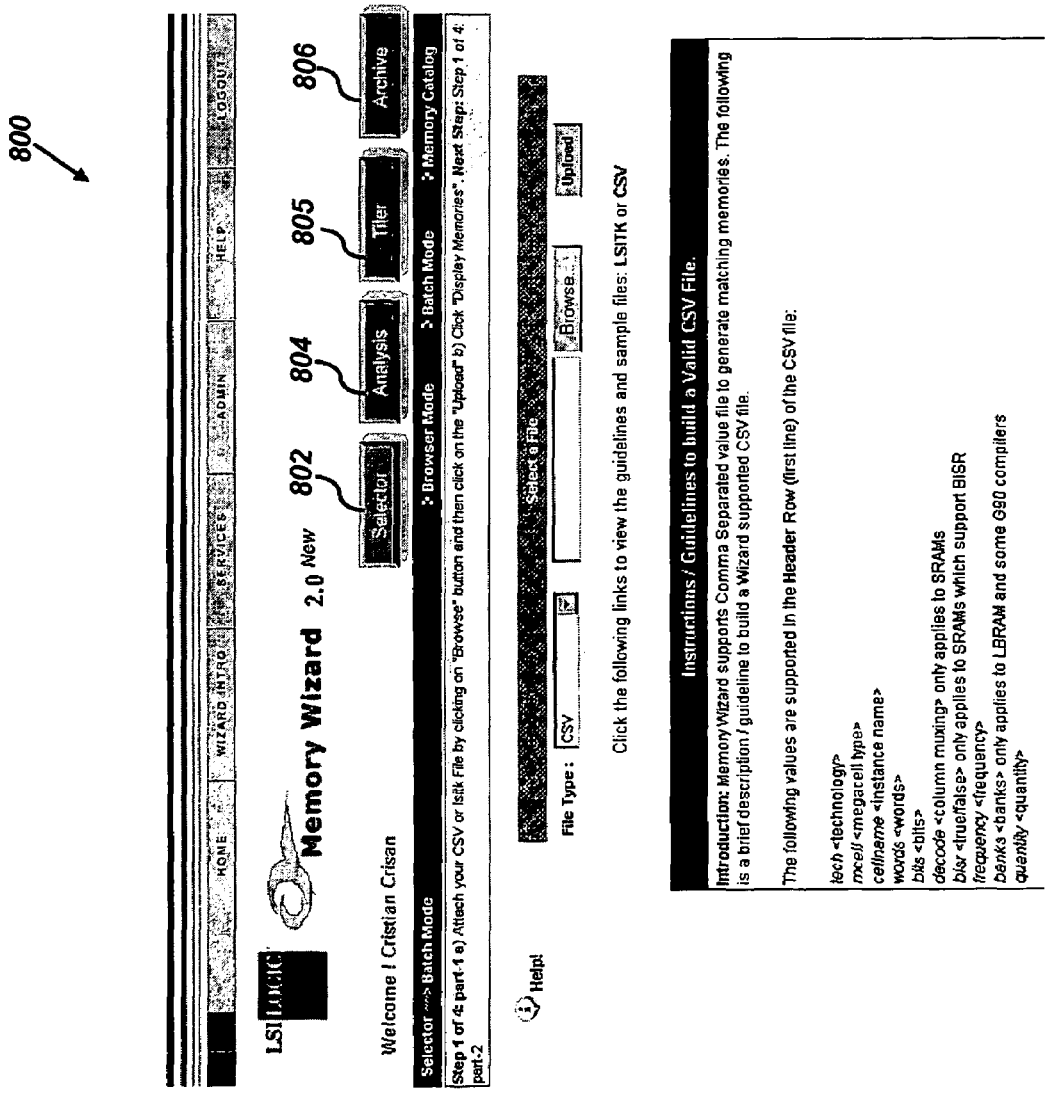
FIG. 8 illustrates an example of a graphical user interface environment that can be implemented in accordance with a preferred embodiment.

FIG. 8 illustrates an example of a graphical user interface (GUI) environment or page 800 that can be implemented in accordance with a preferred embodiment. The GUI environment or page 800 can be implemented in the context of a Web "page" that forms a part of the Memory Wizard application described herein. The GUI environment or page 800 includes a number of graphically displayed features that when selected by a user to generate other applications and operations. Note that in FIGS. 8-19, identical or similar parts or elements are generally indicated by identical reference numerals. Additionally, FIGS. 8-19 represent screen shots, surrounded by brackets, or representative GUI pages for implementing one or more embodiments.

For example GUI page 800 displays graphical "buttons" 802, 804, 805, and 806 that when selected by a user initiate respective selector, analysis, tiler or archive applications. Button 802, when selected by a user, initiates processing of the selector operation described at block 174 in FIG. 7 and the memory selection operation illustrated at block 162 in FIG. 6. Button 804, when selected by a user, initiates the memory analysis operation depicted at block 166 and also described at block 186 in FIG. 7. Button 805, when selected by a user, activates the optional memory tiling operation depicted at block 168 in FIG. 6 and also illustrated at block 179 in FIG. 7. Note that in FIGS. 8-19, identical parts, elements or components are generally indicated by identical reference numerals. FIGS. 8-19 therefore illustrate various aspects of a Memory Wizard application that can be implemented according to the methodology disclosed in FIGS. 6-7.

In general, after receiving an RFQ from a customer, a pre-sales engineer has the option of converting the memory section of the RFQ into, for example, an Excel CSV format. Below is a sample CSV file which can be automatically uploaded using the Memory Wizard's batch mode:

cellname,tech,mcell,words,bits,decode,frequency,bisr (Header Row)
rr32x32,gflxp,mf1p111hs,32,32,8-column,100,false
rr64x64,gflxp,mf1p222hs,64,64,8-column,100,false
lbr32x32,gflxp,1r1w_cp,32,32,100,NA
lbr64x64,gflxp,1r1w_wcp,64,64,NA,100, The Memory Wizard includes a batch mode as indicated at block 172 in FIG. 7 that allows a user to browse to the location of the CSV file. After the user selects the batch file, the Memory Wizard parses the file and loads it onto a server. The Memory Wizard then loops through each memory configuration and checks all parameters to make sure they are valid, and within supported ranges. It automatically adjusts any out of range parameters, and highlights such changes so the user can review and approve them before continuing. For example, the Memory Wizard can check to make certain that the user specified technology and compiler type exist. Compiler parameters such as words, bits, column muxing, bisr, operating frequency etc are checked against the valid range for that compiler.

In order to perform this range checking, the Memory Wizard's database as indicated at block 184 in FIG. 7 contains all relationships between the different memory compiler options. For example, the minimum and maximum words and bits values are depended on the selected column decode. Such a database contains memory cycle time for the entire configuration range of each memory compiler, allowing it to check the user's specified frequency against the maximum supported frequency for that compiler before running any extractions. This feature improves TAT by allowing the user to know whether their specified configuration will meet design performance requirements, without having to wait until the entire set of timing, size and power data has to be generated.

Figure 9:
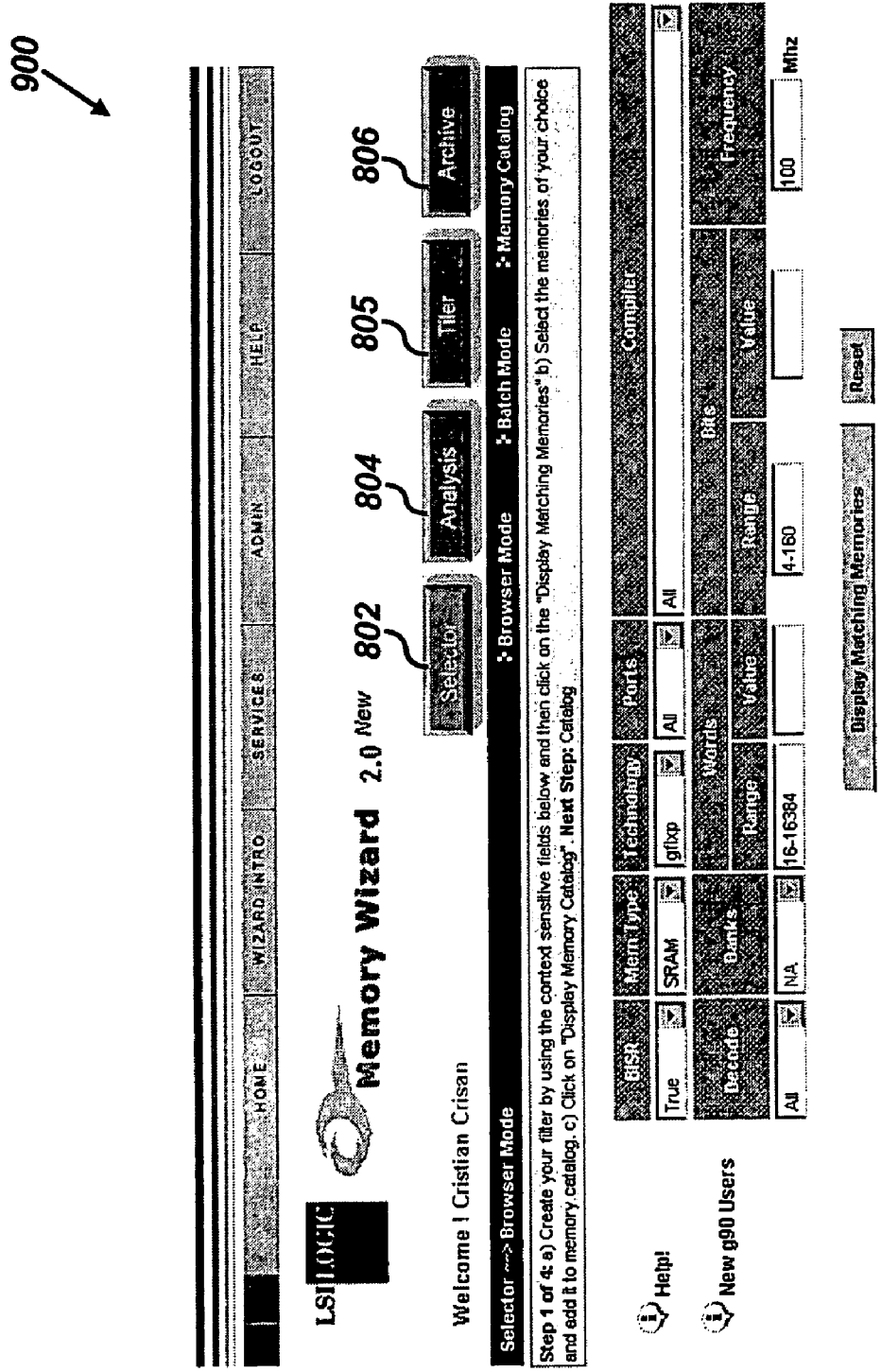
FIG. 9 illustrates another example of a graphical user interface environment that can be implemented in accordance with a preferred embodiment.

FIG. 9 illustrates another example of a graphical user interface environment or page 90 that can be implemented in accordance with a preferred embodiment. GUI environment or page 90 can be implemented, for example, in the context of a Web page of the Memory Wizard application. Another option that can be presented to a pre-sales engineer in such a GUI environment or page can be one which allows the user to select memories using a "browser" mode. Related menus can be utilized to limit the user's selection to only those values supported by each memory compiler. Relates menus also provided the capability to limit the possible ways of implementing a given memory configuration. However, the user also has the option of displaying all memory compilers that support a given words/bits configuration, and select from the resulting list.

Using the aforementioned techniques, a user can analyze different approaches for implementing design memory requirements. During the memory selection step, for example, as indicated at block 162 in FIG. 6 and block 174 in FIG. 7, a user can select and catalog those memories for which he or she desires to generate timing, size and power data. At the end of the selection process, the user can navigate a "Memory Catalog" Web page that contains selected memory configurations. Using checkboxes, the user can select or de-select memories for which they desire data to be generated as indicated, for example, in FIG. 10, which illustrates a further example of a graphical user interface environment or page 1000 that can be implemented in accordance with a preferred embodiment.

Figure 11:
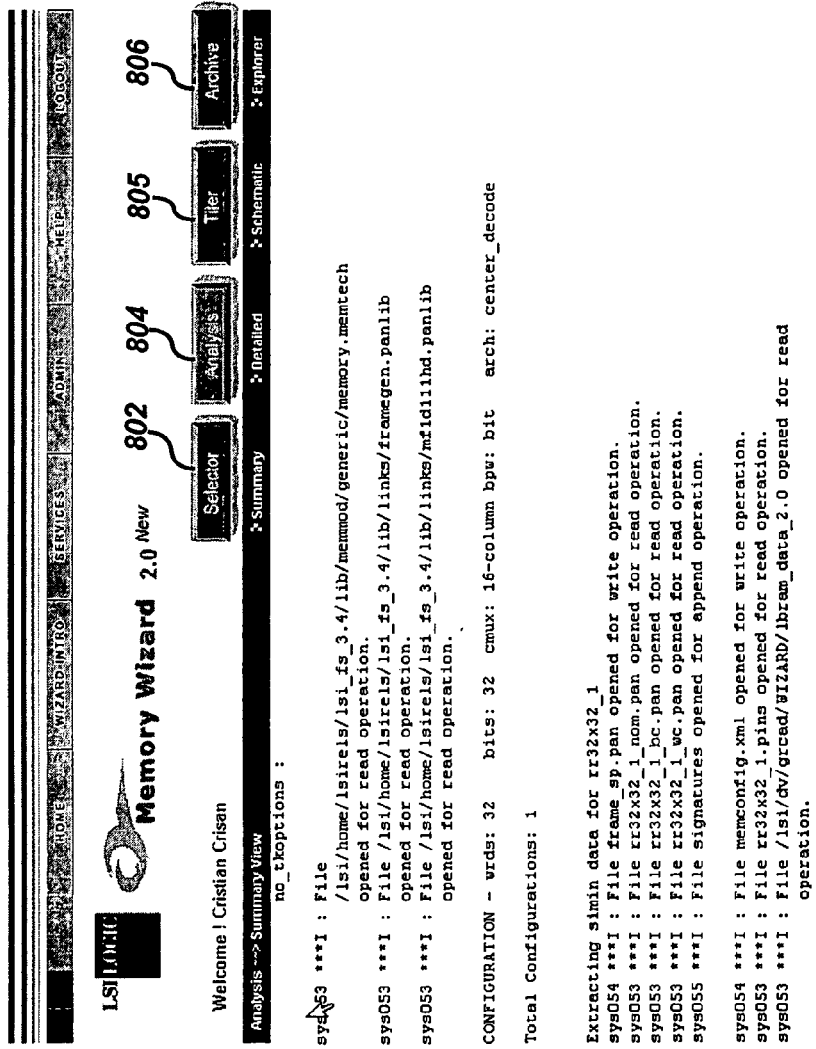
FIG. 11 illustrates another example of a graphical user interface environment that can be implemented in accordance with a preferred embodiment.

FIG. 11 illustrates another example of a graphical user interface environment or page 1100 that can be implemented in accordance with a preferred embodiment. GUI 1100 generally indicates a memory data extraction application. Memory data extraction can be invoked from Memory Wizard's Memory Catalog page, by clicking a "Run Wizard" button displayed via a GUI. This causes the Memory Wizard to run on a ColdFusion PC server to pass all memory configuration data to, for example, Apache CGI PERL script running on Unix. An example of such a scripting operation is depicted at block 176 in FIG. 7.

The CGI PERL script can loop through all memory configurations passed to it, and determine whether the memory is G12/Gflx SRAM, LBRAM or G90 SRAM. Depending on technology and memory type, the script can generate an appropriate interface file, before invoking, for example, another application such as UNIX binary Isiwizard or Virage's ISH executable. Note that that Memory Wizard can be configured as a program written in C and/or C++ that can receive as input memory configuration data (words, bits, column decode, frequency, bisr etc.), and generates ASCII and XML datasheets containing timing, size and power information for the given configuration. Such an Isiwizard program can be utilized to extract memory data for G12/Gflx SRAM's.

Lsiwizard can also be utilized to generate LBRAM data by interpolating size, timing and power parameters from a large set of previously characterized memory configurations. This flow is used for LBRAM's, because the LBRAM compiler is only capable of providing size information. LBRAM timing data generation requires $3^{rd}$ party tools such as Astro and PrimeTime which take a significant amount of time to run, and require $3^{rd}$ party licenses. LBRAM's are built using standard cells, thus power characterization has to be done by running a number of $3^{rd}$ party tools: StarXT, OLA, VerilogXL and PowerTheater. By using pre-characterized configurations, TAT for generating LBRAM data is reduced from a matter of hours to a matter of seconds. And because we pre-characterize thousands of configurations, the accuracy of the results is not compromised.

G90 SRAM data can be generated by invoking Virage's batch mode executable ISH. The CGI PERL script is responsible for setting up the environment or page and generating the appropriate interface file required by ISH. The results from both Isiwizard and Virage ISH, are XML files containing: configuration information (i.e. words, bits, column decode etc), timing parameters (i.e. read access, setup, cycle time etc), size information (width, height, area etc), power (average current, peak current, charge etc.) and test parameters (i.e. nr of BIST/BISR gates, fuse width/height etc). In addition, an ASCII memory datasheet is also generated which can be downloaded by the user.

Figure 12:
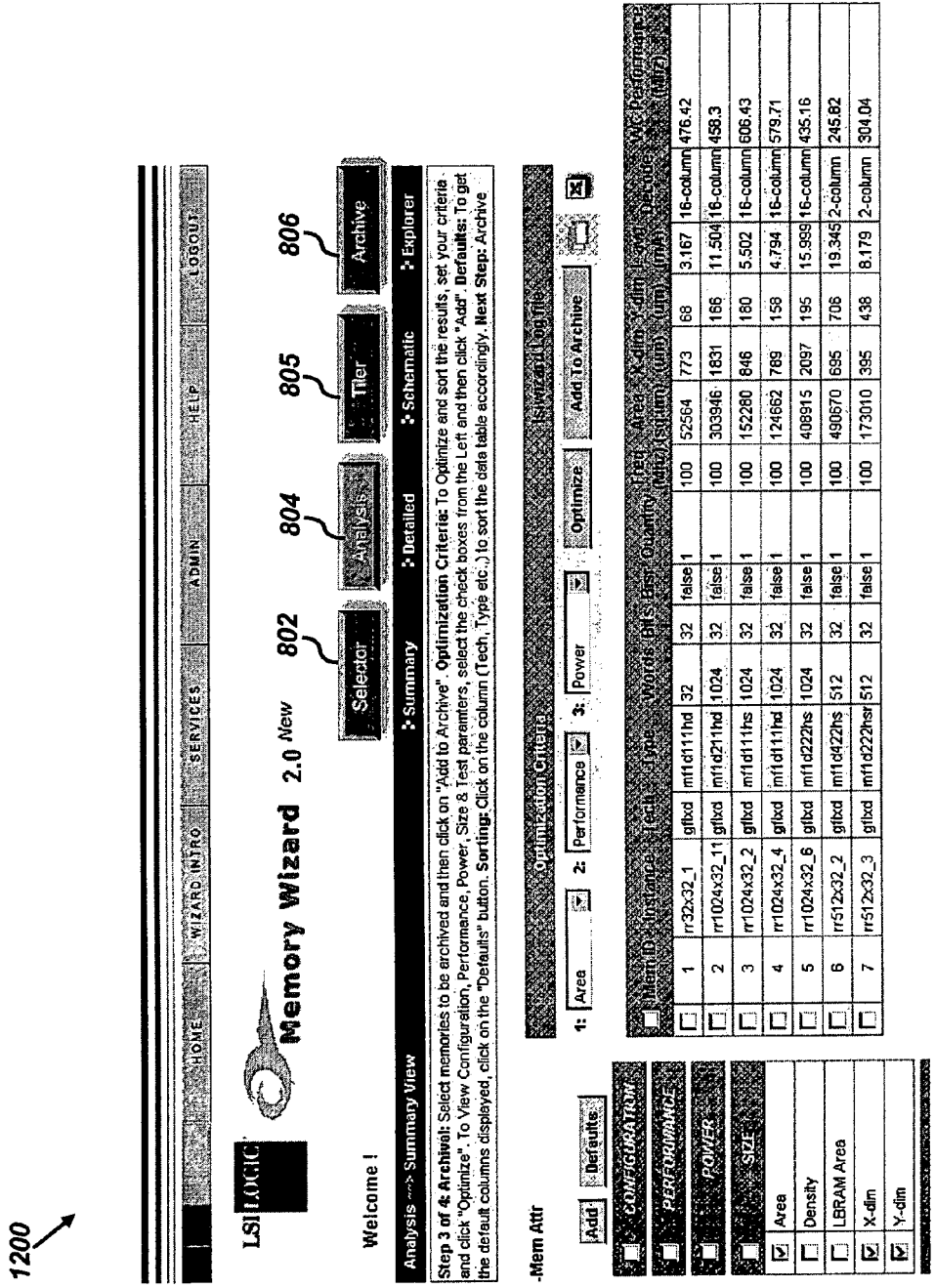
FIG. 12 illustrates a further example of a graphical user interface environment that can be implemented in accordance with a preferred embodiment.

FIG. 12 illustrates a further example of a graphical user interface environment or page or page 1200 that can be implemented in accordance with a preferred embodiment. GUI environment or page 1200 can be utilized to implement memory analysis applications or operations. After the CGI data extraction PERL script finishes, control is passed back to the ColdFusion server running on Windows PC platform, by invoking a CFM page and passing URL parameters to it. Using the URL parameters passed to it. The CFM page builds the path to the session based output directory. All XML files are uploaded, parsed and data is inserted into an Oracle database. During the login process, Wizard creates a unique session ID for every user/browser window. Thus, Wizard is able to support multiple users and even multiple sessions for the same user without any clashes or data corruption.

The Wizard Analysis can page display extracted data in table format. The initial analysis table contains a subset of all available parameters. All available parameters are grouped under the headings: configuration, performance, power, size and test. Users have full control over which parameters to display, or hide by selecting and de-selecting the checkbox next to each parameter. By locating the mouse pointer over a parameter name, a user can view a graphically displayed tool-tip containing the definition for that particular parameter. Through the use of self sorting tables, the user can sort the results by area, timing, performance, power in order to select the optimal memory configuration for their design requirements.

The Wizard Analysis page can provide a number of features that assist the user in analyzing large sets of data, and selecting the best implementation. The "Detailed" view page gives users access to the full list of parameters for the selected configuration, all on one page. The "Schematic" view gives the user the ability to view the aspect ratio of each memory configuration.

Figure 13A:
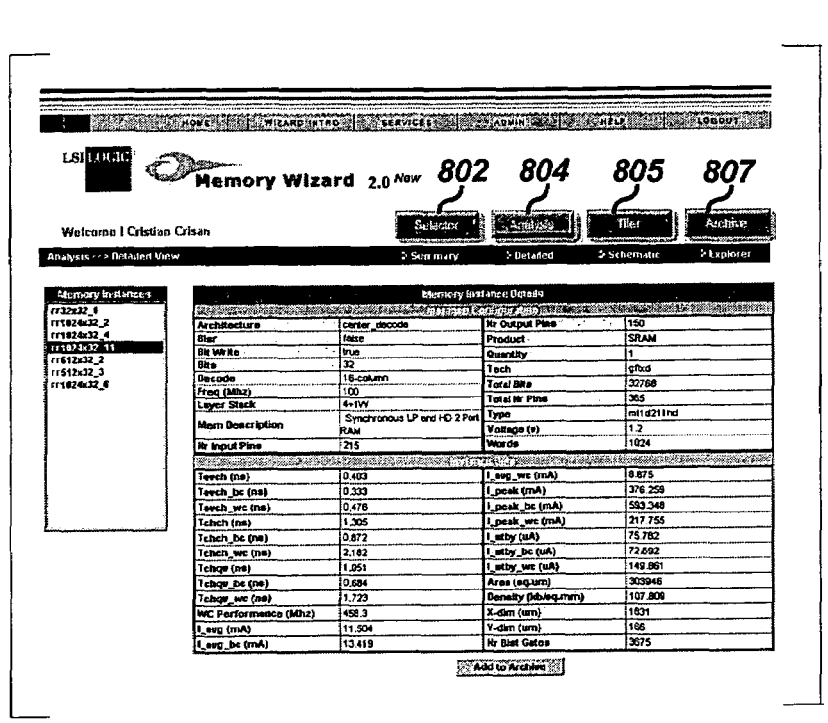
FIGS. 13(a) and 13(b) illustrates another example of a graphical user interface environment that can be implemented in accordance with a preferred embodiment.
Figure 13B:
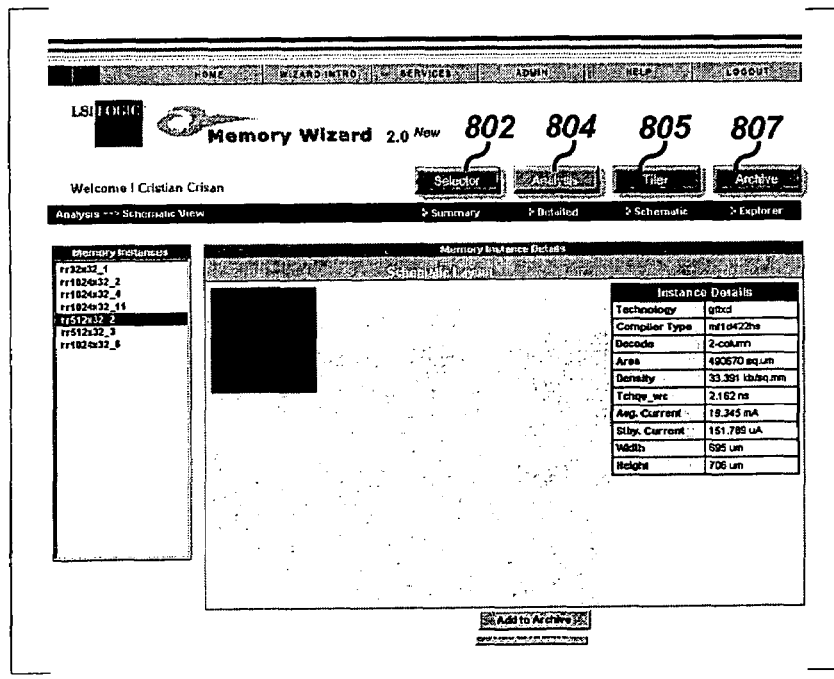

FIGS. 13(*a*) and 13(*b*) illustrates another example of a graphical user interface environment or page 1301 and 1303 that can be implemented in accordance with a preferred embodiment. Memory Wizard as described herein can provide an "Explorer" tool that supports exploratory, tradeoff and optimization analysis on memory data (LBRAM vs. SRAM). Such a tool is depicted at pages 1301 and 1303. By utilizing pages 1301 and 1301, users can iteratively go back to the Selector page by selecting button 802, and extract data for additional memory configurations, and compare data sets from multiple extraction runs in the same Wizard session. After analyzing the data, the user can select and archive optimal implementations.

Figure 14:
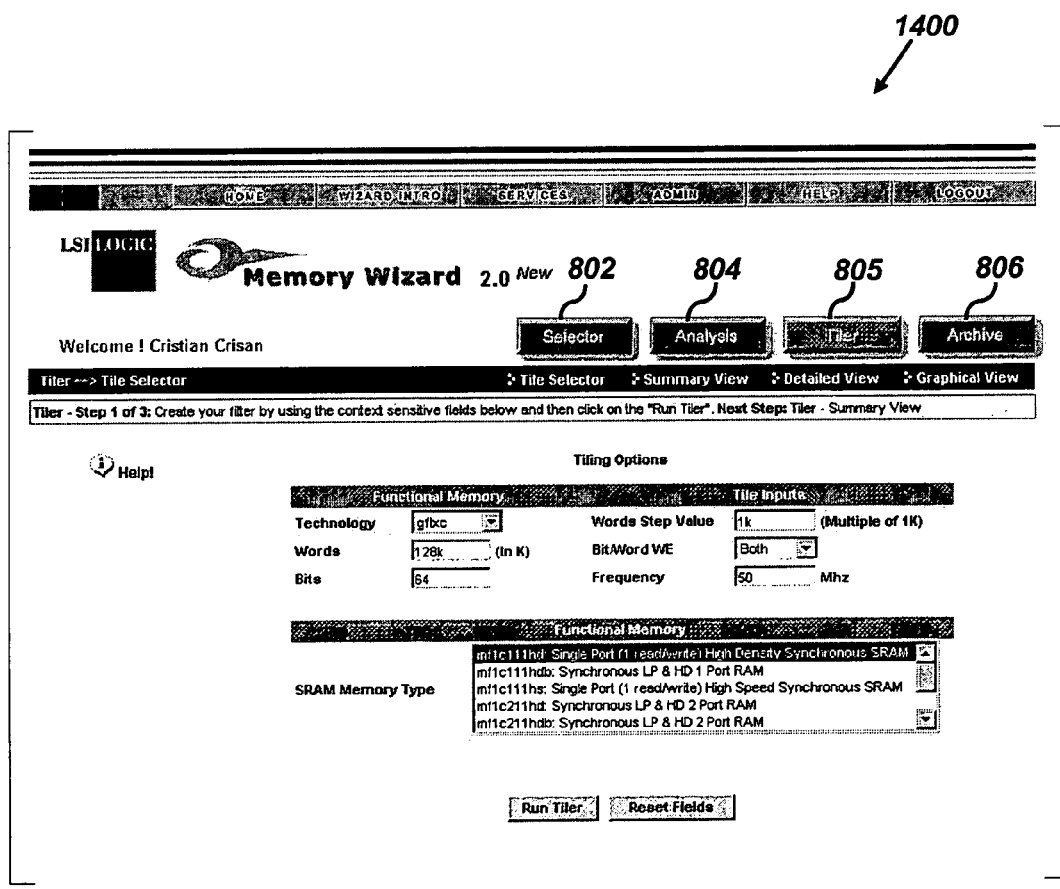
FIG. 14 illustrates a further example of a graphical user interface environment that can be implemented in accordance with a preferred embodiment.

FIG. 14 illustrates a further example of a graphical user interface environment or page 1400 that can be implemented in accordance with a preferred embodiment. GUI page 1400 can be utilized to activate memory tiling operations. Often times, the customer's functional memory blocks are too large to be implemented using one memory configuration instance. In these cases, multiple instances of the same configuration have to be tiled in order to create a larger functional memory block. Due to different configuration variables (words, bits, column decode, bit/word write), the process of figuring out possible configurations (tile) sizes and selecting the optimum tile can be time consuming. Tradeoffs and what-if analysis is necessary in order to select the optimum tile size. For example, the largest tile might give the best density, but not meet timing and/or power requirements of the functional memory block.

The Memory Wizard Tiler page 1400 thus allows the user to specify the size of the large functional memory block. This information is then passed to a CGI PERL script as indicated earlier with respect to block 176 in FIG. 7. The cgi script invokes Isiwizard which runs a tiling algorithm that loops through the different memory compiler configuration variables extracting data for the configurations which can be tiled to form the large functional memory block. Tiled blocks are limited to a maximum of 64 tiles (i.e., 8 rows by 8 columns). During the extraction phase, Isiwizard generates data for the individual tile, as well as estimating the size, timing and power parameters for the tiled functional memory block. Spacing between tiles as well as additional logic (e.g., muxes) are taken into account, in order to more accurately estimate functional memory block timing, size and power parameters.

Figure 15:
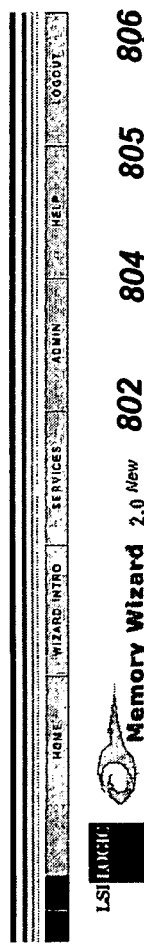
FIG. 15 illustrates another example of a graphical user interface environment that can be implemented in accordance with a preferred embodiment.

FIG. 15 illustrates another example of a graphical user interface environment or page 1500 that can be implemented in accordance with a preferred embodiment. Users can sort through the extraction results using the Tiler analysis page 1500. This analysis page 1500 contains information about which tiled memory block provides the best performance, power and timing. Self sorting tables in the Tiler analysis page 1500 allows the user to perform performance, power and size trade off analysis and select the optimum tile size and tiled functional memory block. The Tiler analysis page 1500 also contains a schematic view to allow the user to see the aspect ratio of the functional memory block.

Figure 16:
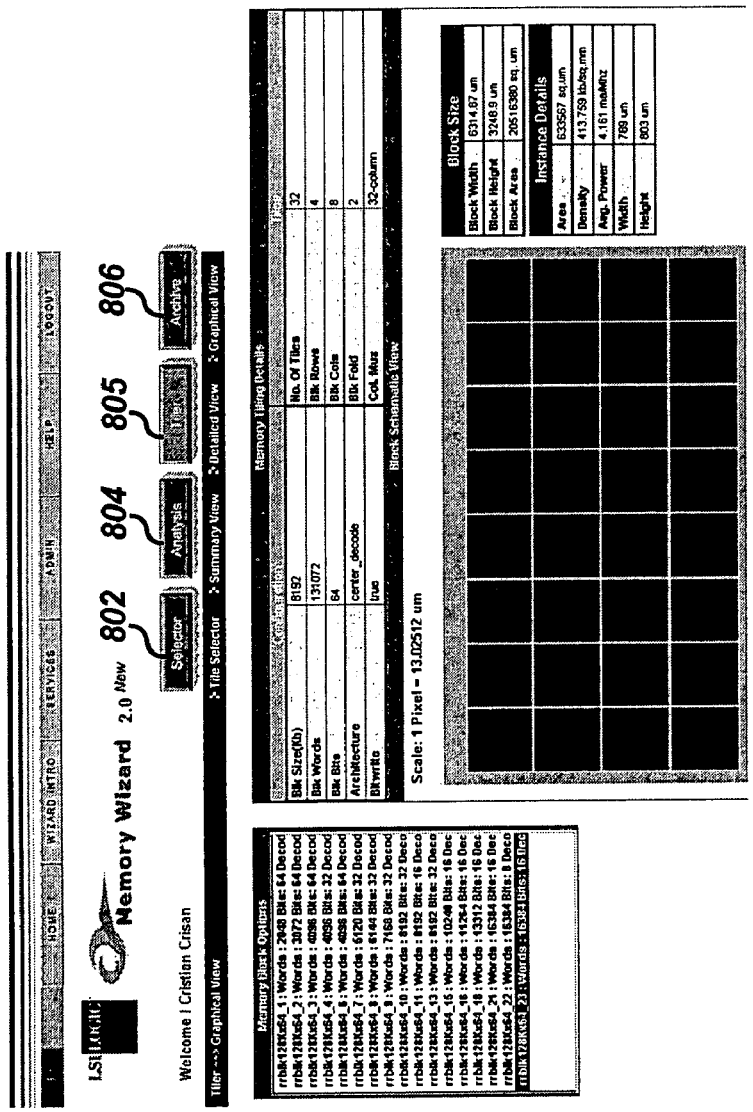
FIG. 16 illustrates a further example of a graphical user interface environment that can be implemented in accordance with a preferred embodiment.

FIG. 16 illustrates a further example of a graphical user interface environment or page 1600 that can be implemented in accordance with a preferred embodiment. As indicated in FIG. 1600, selected configurations can be archived, so that datasheets are bundled into a single tar file to be downloaded by the user.

Figure 17:
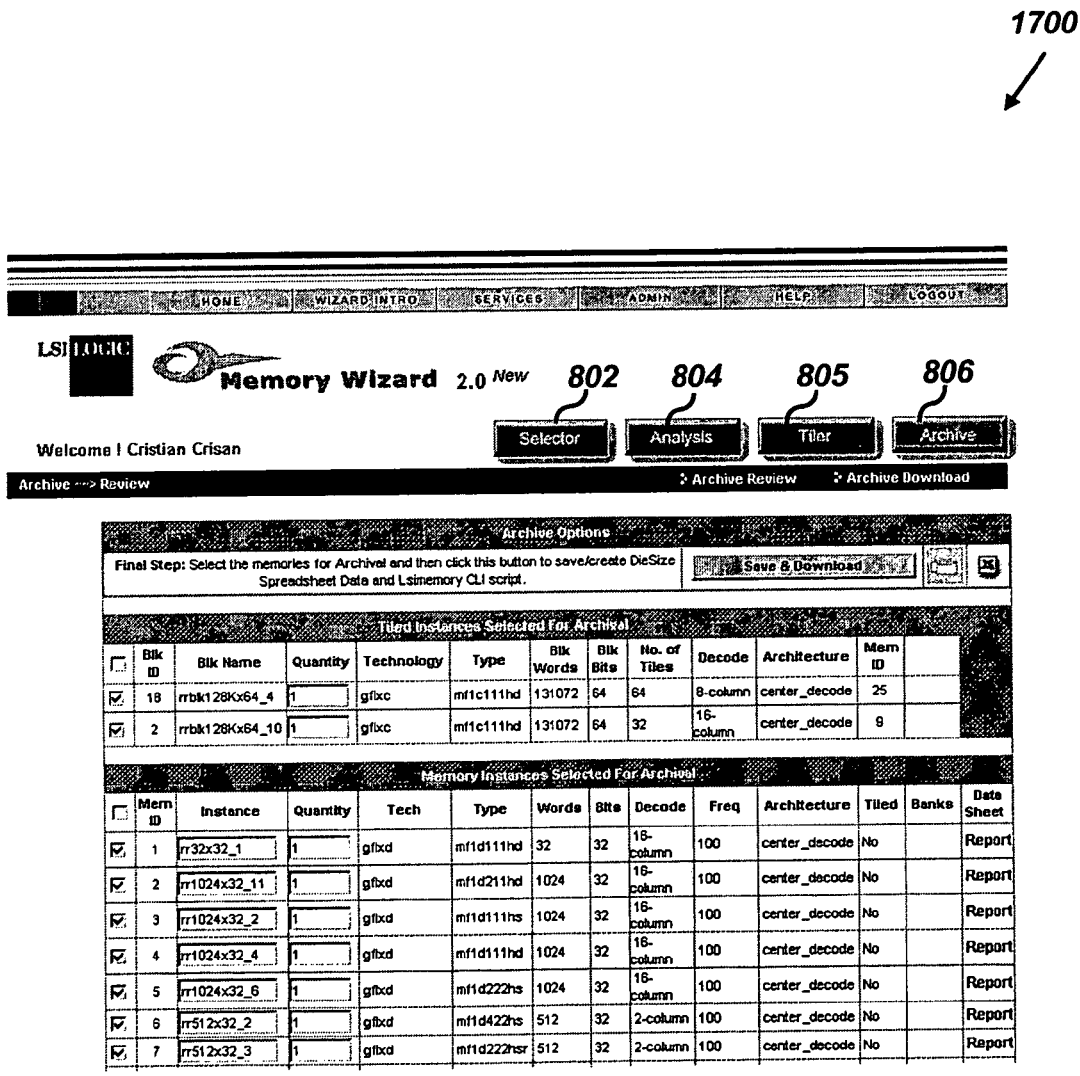
FIG. 17 illustrates another example of a graphical user interface environment that can be implemented in accordance with a preferred embodiment.

FIG. 17 illustrates another example of a graphical user interface environment or page 1700 that can be implemented in accordance with a preferred embodiment. The operations depicted in 1700 can initiate in a final step before leaving a Memory Wizard session. GUI page 1700 can be implemented as an archive page that displays a summary of all memory configurations collected by the user from both the configuration Analysis and Tiler pages. Users have the option of changing memory names, and increasing or decreasing the number of instances for each configuration. A link to the ASCII datasheet is also provided. Checkboxes can be used to select and de-select memories the user wants to export from Wizard. When users are ready to proceed to the download page, they "click" on a "Save and Download" button. This button invokes CGI PERL script, which bundles all memory XML files into one tar ball. The script also generates and bundles command line scripts the user can run to generate the actual memory deliverables outside Memory Wizard. An Excel spreadsheet which can be automatically imported into the DieSize spreadsheet is also generated. Finally, the script generates a tar ball with all memory ASCII datasheets, and a tar ball containing all these files.

Figure 18:
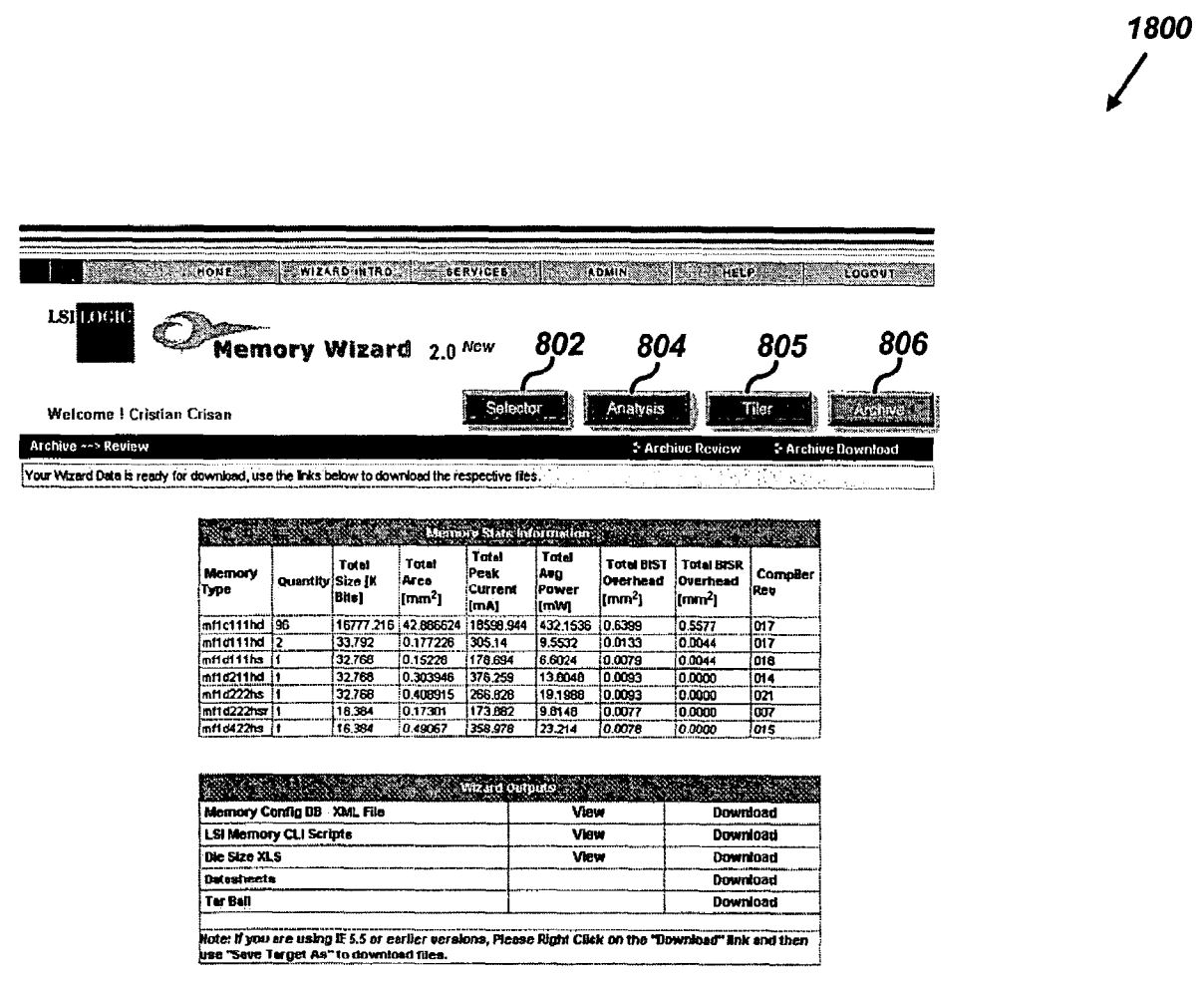

FIG. 18 illustrates a further example of a graphical user interface environment or page 1800 that can be implemented in accordance with a preferred embodiment. The archive download page 1800 can contain a summary table 1801 with the total number of memory bits, area, power and test overhead on a per compiler type basis. The archive page 1800 can also contain a second table 1802 with links to view and/or download the different bundles created by the Archive CGI script.

Figure 19:
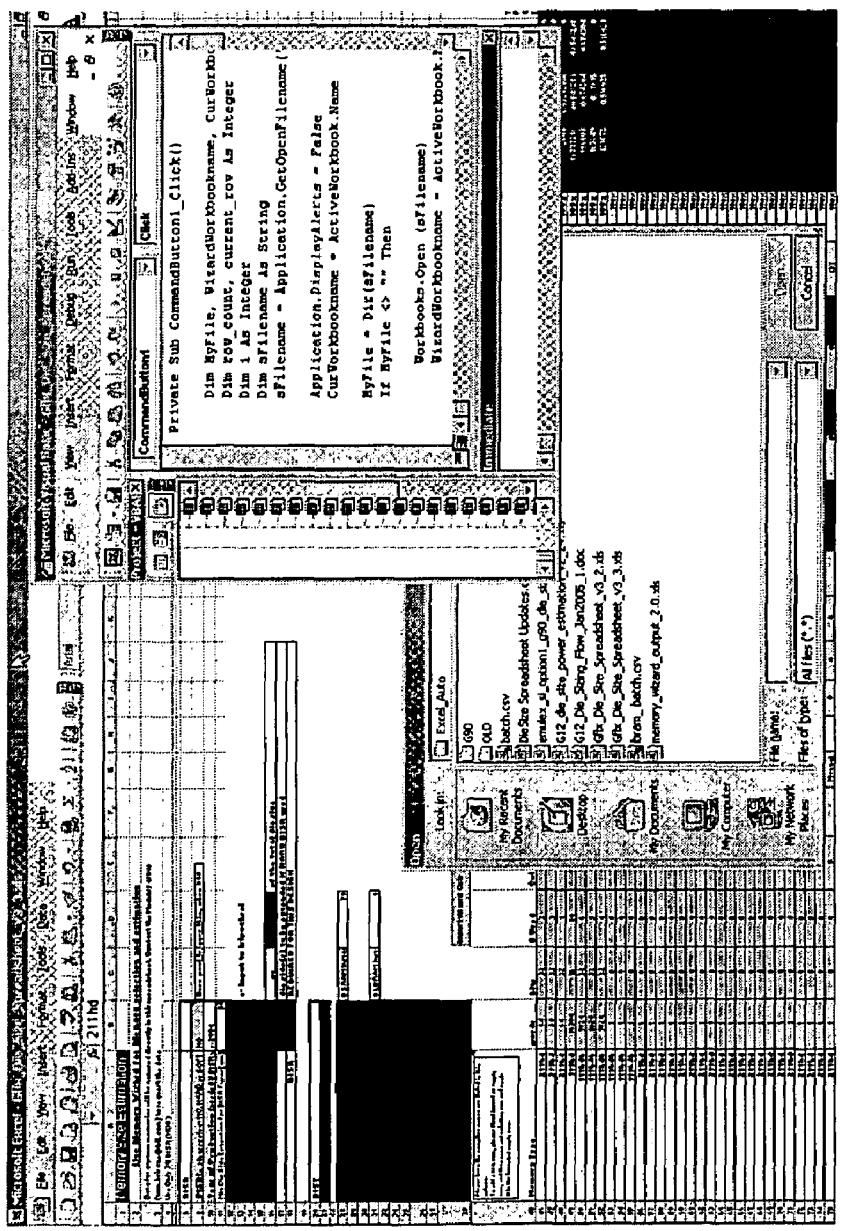
FIG. 19 illustrates another example of a graphical user interface environment that can be implemented in accordance with a preferred embodiment.

FIG. 19 illustrates another example of a graphical user interface environment or page 1900 that can be implemented in accordance with a preferred embodiment. In general, memory data is a subset of what's required for estimating and quoting a DieSize. Other factors include Packaging, IO's, IP Hardmacs and other manufacturing factors. All aspects of DieSize estimation are combined into a single DieSize Spreadsheet.

Memory data exported from Wizard into an Excel (XLS) file can be automatically imported into the DieSize spreadsheet through a Visual Basic macro implemented into the DieSize spreadsheet. Users can simply click a button, browse to the location where the Wizard memory data XLS file is located, and select the file. The Visual Basic macro automatically imports all rows from the Wizard XLS file into the Memory sheet par of the DieSize spreadsheet.

Based on the foregoing, it can be appreciated that the embodiments disclosed herein are directed to a variety of improved manufacturing processes. In general, a single web-based tool can be provided for specifying, generating, analyzing and exporting memory configuration data. CGI script can be provided, which accepts a single or multiple memory configurations through URL parameters. The script then invokes native and/or 3rd party tools to generate memory size, power, and timing and test overhead data into XML files. Additionally, the same memory configuration can be generated using multiple memory compiler options. Users are provided with the ability to look at the results, perform what-if analysis in order to select the best implementation option for their memory requirements.

The entire set of memory requirements for a design can be executed through a single Wizard session. Supporting multiple memory compiler types and configuration sizes allows users to generate and analyze all possible memory implementation options all at once. This feature cuts the amount of effort required to perform optimum memory selection for a large design from a matter of days to hours. Additionally, fast memory data generation runtimes (less than 10 seconds per configuration in most cases) that uses an optimized extraction engine. This fast extraction time allows generation of hundreds of memories in minutes versus hours.

In order display and allow users to see real-time extraction status while maintaining the same browser session, we implemented a mechanism of passing ColdFusion session information to CGI PERL script. CGI script then passed session information back to ColdFusion allowing the user to continue with the same ColdFusion session. Additionally, the Memory Wizard described herein can be utilized to generate LBRAM size, timing and power numbers by interpolating data from a large set of pre-extracted configurations without having to run full characterization. The Memory Wizard can also permit a user to access session specific data which was generated on a different server. XML files containing memory data pertaining to each separate session are parsed and uploaded into an Oracle database for the purpose of later retrieval based on user defined queries.

The Memory Wizard additionally permits the display of large sets of memory configuration, size, timing, and power and test overhead data into self-sorting html tables. Allow the user to add/remove columns in order to analyze the entire memory data set and perform tradeoff analysis. The tiling algorithm described earlier can generate possible configurations (i.e., tiles) that can be used to implement large memory requirements. The Memory Wizard can also simulate and report size, timing and power information for blocks that result from tiling multiple instances of the same memory configuration. In addition, the Memory Wizard is capable of generating BIST and BISR overheads (i.e., gate counts) using a formula based on collar and controller constants. Constants are derived from BIST/BISR data from a large set of memory configurations.

The Memory Wizard also possesses the ability to dynamically specify memory configurations through the use of context sensitive related menus or load configurations from a batch file. The Memory Wizard can also be utilized to validate user memory configuration options such as words, bits, and column decode and BISR against predefined valid ranges. The Memory Wizard additionally determines whether the user specified frequency for a given configuration falls within a selected memory compiler performance range, before invoking any data extraction scripts, by performing a database "lookup" operation.

The Memory Wizard can also generate and export memory configuration, size, timing, and power and test overhead through XML and XLS files, and create and allow the user can to download command line scripts which can be used to run native and/or 3rd party tools and generate memory deliverables required by an ASIC design. Additionally, the Memory Wizard can be utilized to generate memory datasheets, create tar ball and provide the user with a link for downloading the datasheets. Finally, the Memory Wizard can automatically import memory configurations generated by Wizard web-based tool, size, timing, power and test overhead parameters into pre-existing DieSize Excel spreadsheet through a Visual Basic macro.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

What is claimed is:

1. A method, comprising:
   providing an interactive network-based site that permits a user to specify, compile, analyze and export memory configuration data associated with at least one memory component;
   presenting a plurality of memory specification options to a user;
   accepting at least one of the memory specification options from the user;
   finding a plurality of selectable memories meeting the memory specification options accepted from the user;
   presenting the selectable memories to the user;
   accepting at least one memory selection from the user;
   passing the at least one memory selection to a memory compiler and to an analyzer to produce memory configuration data; and
   exporting the memory configuration data.

2. The method of claim 1 further comprising associating said network-based site with a script language that accepts single memory configuration data or multiple memory configuration data utilizing at least one URL parameter.

3. The method of claim 1 further comprising:
   generating said memory configuration data in response to a particular user input, wherein said memory configuration data is generated using multiple input options to the memory compiler.

4. The method of claim 1 further comprising displaying the memory configuration data in a tabular form wherein the tabular form is sorted in conformance with a user preference.

5. The method of claim 1 further comprising tiling in order to meet large memory size requirements.

6. The method of claim 1 wherein said memory configuration data comprises data associated with said at least one memory component, wherein said at least one memory component comprises an LBRAM.

7. The method of claim 1 wherein said memory configuration data comprises data associated with said at least one memory component, wherein said at least one memory component comprises an SRAM.

8. A system, comprising a recordable medium embodying at least one control program that when executed by a data processing apparatus causes the system to instantiate and support a plurality of modules comprising:
   an interactive network-based site that permits a user to specify, compile, analyze and export memory configuration data;
   a memory selector that accepts a memory property specification from the user and presents zero or more selectable memories to the user wherein the user selects zero or more selected memories from the selectable memories;
   a memory compiler that also accepts a memory property specification from the user, generates zero or more selectable compiled memories meeting the memory property specification and presents the selectable compiled memories to the user wherein the user selects zero or more selected memories from the selectable compiled memories;
   a memory analyzer that supplies timing, size and power data for the selected memories wherein the selected memories comprise at least one selectable memory or at least one selectable compiled memory; and
   a memory configuration exporting module that provides the user with at least one memory configuration describing at least one selected memory.

9. The system of claim 8 wherein the memory property specification is specified via a context sensitive menu or a batch file.

10. The system of claim 8 further comprising a script language that accepts single memory configuration data or multiple memory configuration data utilizing at least one URL parameter.

11. The system of claim 8 wherein said memory compiler accepts multiple compiler input options such that the memory configuration data is generated using multiple memory compiler input options.

12. The system of claim 8 further comprising a module for displaying said at least one memory selection into a table for display for said user via a graphical user interface and wherein the table is sorted in conformance with a user preference.

13. The system of claim 8 further comprising a memory tiler.

* * * * *